*D. W. Messer,*
*Molasses Pitcher,*
Nº 17,048. Patented Apr. 14, 1857.
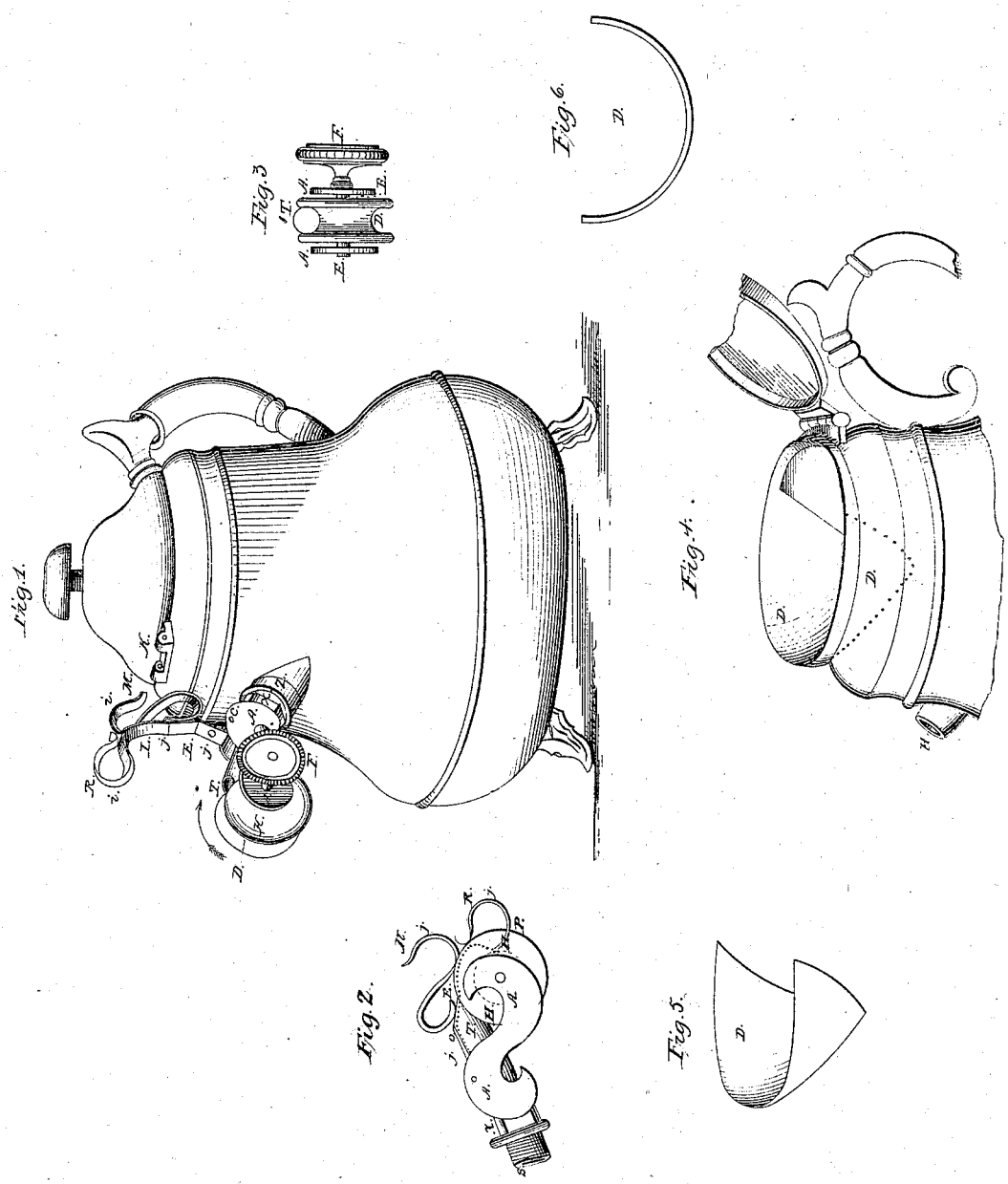

UNITED STATES PATENT OFFICE.

DANIEL W. MESSER, OF BOSTON, MASSACHUSETTS.

MOLASSES-CUP.

Specification of Letters Patent No. 17,048, dated April 14, 1857.

*To all whom it may concern:*

Be it known that I, DANIEL W. MESSER, of Boston, in the county of Suffolk and State of Massachusetts, have invented a new and useful improvement to attach to vessels intended to contain molasses or other viscid fluids where the design is to pour the said fluid from the said vessel, as in molasses-cups.

The object of the improvement consists in preventing the said fluid which remains on the lip of said vessel (after pouring from the same) from dripping and I do hereby declare that the following is a full and exact description thereof, reference being had to the annexed drawings making a part of this specification in which—

Figure 1 is a perspective view of a vessel with the improvement attached. Fig. 2 is a longitudinal view of the part constituting the improvement. Fig. 3 is a transverse view of the same. Fig. 4 represents the top of the vessel with the lid raised showing a diaphragm in the mouth. Fig. 5 represents the diaphragm removed. Fig. 6 represents a transverse section of the same.

To enable others skilled in the art to make and use my invention I will proceed to describe its construction and operation.

T, Fig. 1, represents the aperture of the spout or channel or guideway to direct the course of the fluid.

H, Fig. 1, represents a grooved wheel or pulley a transverse section of which is shown in Fig. 3. D represents the groove; T the aperture of spout or channel way which is made to fit the groove of the pulley as represented in Fig. 3.

Fig. 1, D dot line, represents the groove in place being in the line of the channel way shown at T Fig. 2.

Fig. 1, F, is a milled head intended to be used to turn the pulley H, a section of the milled head is shown at F, Fig. 3, being connected with the axis of the pulley by a male screw on the said axis.

E and dot line E, Fig. 3, show the axis of the pulley being hung between the hangers, an end view of which is shown at A A Fig. 3. A partly side view is shown at A A Fig. 1 and a side view of the same is shown at A A, Fig. 2, the said hangers holding the pulley H H in place, and forming the connection with the channel way T.

X, Fig. 1, is a continuation of the channel way showing it connected, with the vessel. X, Fig. 2, shows the continuance of the said channel or guide way. S shows a male thread connecting the said channel way and pulley with the female connection shown at H, Fig. 4, which is soldered to the vessel.

Fig. 1, I O E I L I R represents a cover or lid intended to close the aperture T and also to fit into and on the groove D dot line.

Fig. 2, I O E and the dot line from E to H represents the cover in place. P I R represents a brace simply. M I shows a catch. The same part is shown in Fig. 1 at M I, where the end edge below M is intended to catch on the table K, the object being to hold the cover or lid above mentioned up out of the way of the fluid when the vessel is in use.

It will be observed by referring to the drawings Figs. 1 and 2 that the channel way or spout T and T X has a considerable inclination and that the aperture T, Fig. 1, lies considerably below the perpendicular diameter in toward the vessel, thus forming with the sides and bottom of the groove of the pulley together with the aperture of the channel way or spout a dish, the use of which will be shown when the method of using the apparatus is described.

The diaphragm shown at D D Fig. 4 is intended to act as a barrier to the exit of a fluid by the way of the mouth, it being placed at such an angle as to allow the fluid to run in readily when the vessel is filled.

Fig. 5, D, shows the diaphragm in a side view.

Fig. 6 shows a section of the diaphragm being the form of the part at right angles to the side. The diaphragm may be a fixture or movable or not used as the case may require when the diaphragm is movable it may be attached in any practicable manner.

The method of using my improvement is in this way. Take the vessel by the handle and incline it so as to pour the fluid through the spout or channel way X T, Fig. 2, the aperture of which is shown at T, Fig. 1. Having poured, the vessel is returned to a horizontal position. The milled head is then to be turned so as to throw the pulley in, around in the direction of the arrow. The channel way or spout being fitted to the groove of the pulley as described scrapes off the adhering molasses or fluid. Now it being a viscid fluid it will not run down at once, showing thereby the use of setting the aperture of the tube back as shown above, thus forming a space for the fluid to accumulate in when it will run down by degrees.

I do not claim as my invention any vessel to contain viscid fluids; neither do I claim a cover or diaphragm as described; nor do I claim any method of fastening the spout or channel way to the vessel as by a screw or solder, as all mentioned above was known before. But What I do claim as my invention and desire to secure by Letters Patent is—

The adaptation of a movable surface or lip to vessels intended to contain molasses or fluids of the same viscidity, said surface so situated in relation or position with the spout or channel way and forming part of the same that by moving the said surface in the manner set forth and described in my specification and drawings, the viscid fluid or molasses which remains on the movable surface or lip after pouring from the said vessel is by the practice of my invention returned to a position where by the force of gravity it returns to the vessel; but in ordinary vessels drips from the mouth or lip.

D. W. MESSER.

In the presence of—
L. M. SARGENT, Jr.,
THOS. B. HALL.